US010621480B2

United States Patent
Mutsuo et al.

(10) Patent No.: US 10,621,480 B2
(45) Date of Patent: *Apr. 14, 2020

(54) IMAGE FORMING APPARATUS AND TONER AMOUNT CALCULATING METHOD

(71) Applicant: KYOCERA Document Solutions Inc., Osaka (JP)

(72) Inventors: Toshiaki Mutsuo, Osaka (JP); Hiroki Tanaka, Osaka (JP); Takayuki Mashimo, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/123,298

(22) Filed: Sep. 6, 2018

(65) Prior Publication Data

US 2019/0080213 A1 Mar. 14, 2019

(30) Foreign Application Priority Data

Sep. 8, 2017 (JP) ................ 2017-172612

(51) Int. Cl.
| | | |
|---|---|---|
| G06K 15/00 | (2006.01) | |
| G03G 15/00 | (2006.01) | |
| H04N 1/58 | (2006.01) | |
| G06K 15/12 | (2006.01) | |
| H04N 1/60 | (2006.01) | |

(52) U.S. Cl.
CPC ....... *G06K 15/4075* (2013.01); *G03G 15/556* (2013.01); *G06K 15/129* (2013.01); *H04N 1/58* (2013.01); *H04N 1/6027* (2013.01)

(58) Field of Classification Search
CPC ..... G06K 15/4075; G03G 15/556; H04N 1/58
See application file for complete search history.

(56) References Cited

U.S. PATENT DOCUMENTS

2007/0103717 A1 5/2007 Ono
2019/0079442 A1* 3/2019 Mutsuo ............... G03G 15/556

FOREIGN PATENT DOCUMENTS

JP 2007-133186 5/2007
JP 2012-150182 8/2012

\* cited by examiner

*Primary Examiner* — King Y Poon
*Assistant Examiner* — Michael Burleson

(57) ABSTRACT

A base toner amount determining unit is configured to determine a base toner amount without taking edge effect into account, the base toner amount corresponding to a pixel value of image data for which gradation correction has not been performed. A laser profile applying unit is configured to perform for the base toner amount a first spatial filter process corresponding to a laser profile of an exposure device. An edge emphasis amount determining unit is configured to perform a second spatial filter process for the base toner amount before the first spatial filter process or after the first spatial filter process and thereby determine an edge emphasis amount corresponding to the edge effect. A toner counter is configured to count as a toner consumption amount a sum of the base toner amount after the first spatial filter process and the edge emphasis amount.

9 Claims, 7 Drawing Sheets

IMAGE FORMING APPARATUS AND TONER AMOUNT CALCULATING METHOD

CROSS-REFERENCE TO RELATED APPLICATIONS

This application relates to and claims priority rights from Japanese Patent Application No. 2017-172612, filed on Sep. 8, 2017, the entire disclosures of which are hereby incorporated by reference herein.

BACKGROUND

1. Field of the Present Disclosure

The present disclosure relates to an image forming apparatus and a toner amount calculating method.

2. Description of the Related Art

An electrophotographic image forming apparatus such as a printer or a multi function peripheral obtains toner from a toner cartridge and forms an image using the toner. Some of such image forming apparatuses measure a toner consumption amount.

In an electrophotographic image forming apparatus, an electrostatic latent image is formed on a photoconductor drum or the like. An edge electric field appears at a boundary part between a part with a dot of an electrostatic latent image and a part without a dot of an electrostatic latent image, and consequently toner is consumed more than needed. This phenomenon is called "edge effect". Therefore, a lot of methods have been proposed for calculating a toner consumption amount with taking the edge effect into account.

In an image forming apparatus, a toner consumption amount is calculated on the basis of an exposure signal for laser light.

Further, in an image forming apparatus, an exposure energy of each subpixel is calculated with taking a laser light profile (i.e. a spatial intensity distribution) into account, and a toner consumption amount is calculated on the basis of the exposure energy.

The aforementioned exposure signal is generated on the basis of image data for which a gradation correction process has been performed. The gradation correction process is a process to correct a value of the image data so as to cause a relationship between the image data and gradation levels of toner density to get close to a linear one on the basis of a non linear characteristic (i.e. a gamma curve). The gradation correction process is performed on the basis of a non linear characteristic obtained in a calibration, and for a gradation level of which a density is lower than one in a linear characteristic, a value of the image is increased, and for a gradation level of which a density is higher than one in a linear characteristic, a value of the image is decreased. Therefore, the exposure signal is generated so as to obtain an exposure intensity proportional to a value after the gradation correction, and consequently, a relationship between the exposure intensities and gradation levels of toner density is not linear, and even if a toner consumption amount is calculated on the basis of the exposure signal with taking the edge effect into account, an error may appear in the calculated toner consumption amount.

SUMMARY

An image forming apparatus according to an aspect of the present disclosure includes an exposure device, a base toner amount determining unit, a laser profile applying unit, an edge emphasis amount determining unit, and a toner counter. The base toner amount determining unit is configured to determine a base toner amount without taking edge effect into account, the base toner amount corresponding to a pixel value of image data for which gradation correction has not been performed. The laser profile applying unit is configured to perform for the base toner amount a first spatial filter process corresponding to a laser profile of the exposure device. The edge emphasis amount determining unit is configured to perform a second spatial filter process for the base toner amount before the first spatial filter process or after the first spatial filter process and thereby determine an edge emphasis amount corresponding to the edge effect. The toner counter is configured to count as a toner consumption amount a sum of the base toner amount after the first spatial filter process and the edge emphasis amount.

A toner amount calculating method according to an aspect of the present disclosure includes the steps of: determining a base toner amount without taking edge effect into account, the base toner amount corresponding to a pixel value of image data for which gradation correction has not been performed; performing for the base toner amount a first spatial filter process corresponding to a laser profile of an exposure device; performing a second spatial filter process for the base toner amount before the first spatial filter process or after the first spatial filter process and thereby determining an edge emphasis amount corresponding to the edge effect; and counting as a toner consumption amount a sum of the base toner amount after the first spatial filter process and the edge emphasis amount.

These and other objects, features and advantages of the present disclosure will become more apparent upon reading of the following detailed description along with the accompanied drawings.

DETAILED DESCRIPTION

Hereinafter, embodiments according to an aspect of the present disclosure will be explained with reference to drawings.

Embodiment 1

Figure 1:
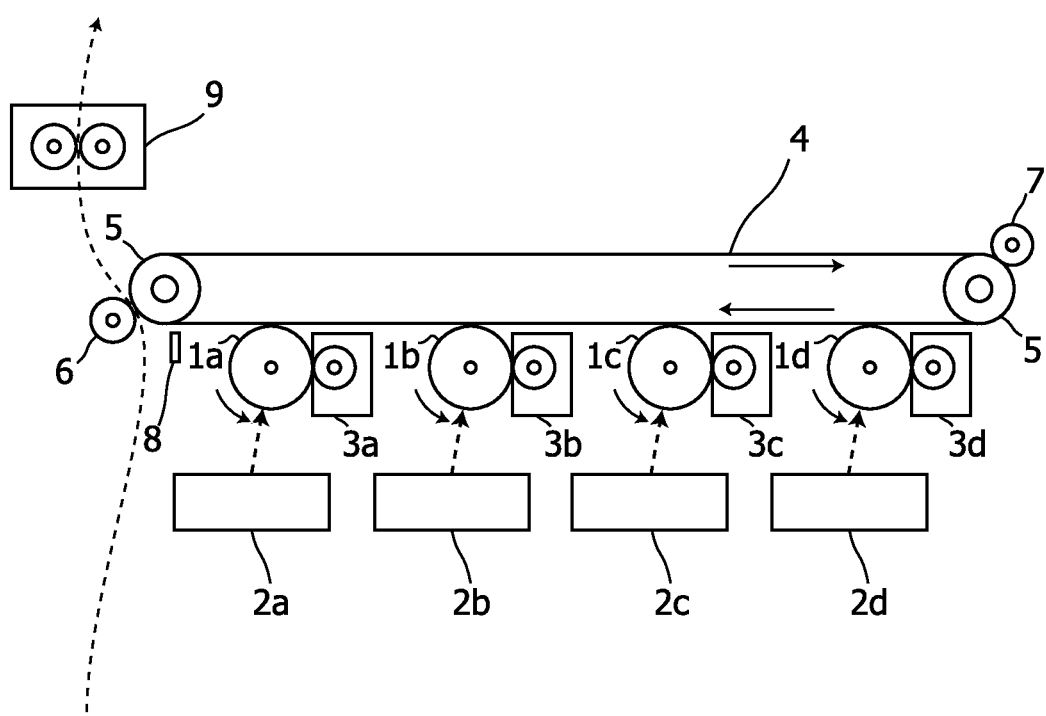
FIG. 1 shows a side view that indicates an internal mechanical configuration of an image forming apparatus in an embodiment according to the present disclosure.

FIG. 1 shows a side view that indicates an internal mechanical configuration of an image forming apparatus in an embodiment according to the present disclosure. This image forming apparatus is an apparatus having a printing function such as a printer, a facsimile machine, a copier or a multi function peripheral.

The image forming apparatus in this embodiment includes a tandem-type color development device. This color development device includes photoconductor drums 1a to 1d, exposure devices 2a to 2d, and development units 3a to 3d. The photoconductor drums 1a to 1d are photoconductors of four colors: Cyan, Magenta, Yellow and Black.

The exposure devices 2a to 2d are devices that form electrostatic latent images by scanning and irradiating the photo conductor drums 1a to 1d with laser light, respectively. The photo conductor drum 1a, 1b, 1c or 1d is scanned with the laser light in a direction (a primary scanning direction) perpendicular to a rotation direction (a secondary scanning direction) of the photo conductor drum. The exposure devices 2a to 2d include laser scanning units that include laser diodes as light sources of the laser light, optical elements (such as lens, mirror and polygon mirror) that guide the laser light to the photo conductor drums 1a to 1d, respectively.

Further, in the periphery of each one of the photo conductor drums 1a to 1d, a charging unit such as scorotron, a cleaning device, a static electricity eliminator and the like are disposed. The cleaning device removes residual toner on each one of the photo conductor drums 1a to 1d after primary transfer. The static electricity eliminator eliminates static electricity of each one of the photo conductor drums 1a to 1d after primary transfer.

The development unit 3a, 3b, 3c or 3d includes a toner cartridge and a development device. The toner cartridge contains toner of one of four colors: Cyan, Magenta, Yellow, and Black. The toner is supplied from a toner hopper in the toner cartridge to the development device. The development device adheres the toner on the photoconductor drum 1a, 1b, 1c, or 1d. The development unit 3a, 3b, 3c, or 3d forms a toner image by adhering the toner to an electrostatic latent image on the photoconductor drum 1a, 1b, 1c, or 1d.

The photoconductor drum 1a and the development unit 3a perform development of Magenta. The photoconductor drum 1b and the development unit 3b perform development of Cyan. The photoconductor drum 1c and the development unit 3c perform development of Yellow. The photoconductor drum 1d and the development unit 3d perform development of Black.

An intermediate transfer belt 4 is a loop-shaped image carrier (here an intermediate transfer member), and contacts the photoconductor drums 1a to 1d. Toner images on the photoconductor drums 1a to 1d are primarily transferred onto the intermediate transfer belt 4. The intermediate transfer belt 4 is hitched around driving rollers 5, and rotates by driving force of the driving rollers 5 towards the direction from the contact position with the photoconductor drum 1d to the contact position with the photoconductor drum 1a.

A transfer roller 6 causes a conveyed paper sheet to contact the transfer belt 4, and secondarily transfers the toner image on the transfer belt 4 to the paper sheet. The paper sheet on which the toner image has been transferred is transported to a fuser 9, and consequently, the toner image is fixed on the paper sheet.

A roller 7 has a cleaning brush, and removes residual toner on the intermediate transfer belt 4 by contacting the cleaning brush to the intermediate transfer belt 4 after transferring the toner image to the paper sheet.

A sensor 8 irradiates the intermediate transfer belt 4 with a light beam, and detects its reflection light from a surface of the intermediate transfer belt 4 or a toner pattern on the intermediate transfer belt 4. For example, in toner gradation adjustment (adjustment of a non linear characteristic of the gradation correction), the sensor 8 irradiates a predetermined area on the intermediate transfer belt 4 with a light beam, detects reflection light of the light beam, and outputs an electrical signal corresponding to the detected intensity of the reflection light.

Figure 2:
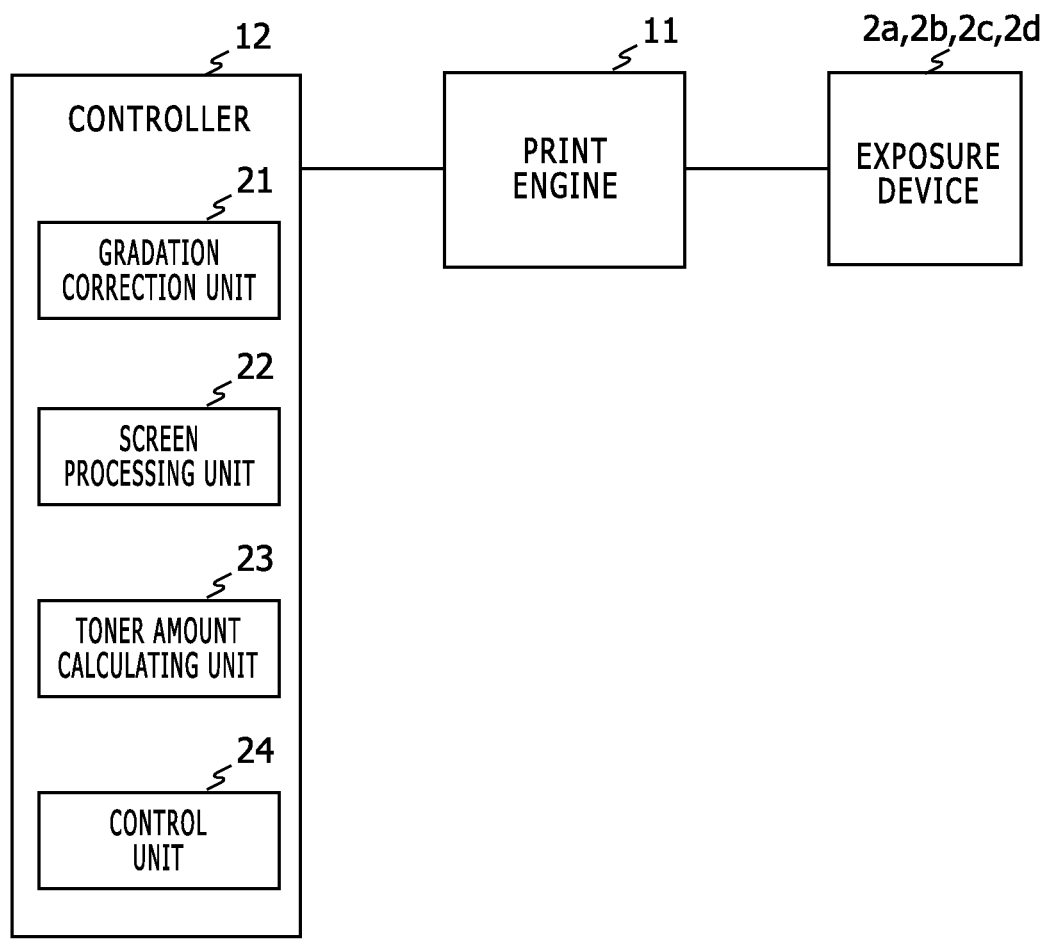
FIG. 2 shows a block diagram that indicates an electronic configuration of the image forming apparatus in the embodiment according to the present disclosure.

FIG. 2 shows a block diagram that indicates an electronic configuration of the image forming apparatus in the embodiment according to the present disclosure. This image forming apparatus includes a print engine 11 and a controller 12.

In FIG. 2, the print engine 11 is an electronic circuit that controls (a) driving mechanisms for electrophotography process and paper sheet transportation and (b) the exposure devices 2a to 2d. The print engine 11 performs printing in accordance with image data received from the controller 12. For example, the driving mechanism of paper sheet transportation includes motors that drive rollers for (a) feeding a paper sheet, (b) transporting a paper sheet to the aforementioned development device and the fuser 9, (c) outputting a paper sheet after completion of printing, and the like. For example, the driving mechanism of an electrophotography process includes (a) motors that drive the photoconductor drums 1a to 1d, the intermediate transfer belt 4 and the like, and (b) motors for laser scanning in the exposure device 2.

The print engine 11 generates an exposure signal on the basis of image data received from the controller 12. The exposure signal indicates on each pixel (a) whether irradiating with light or not and (b) irradiating time, on the basis of the image data received from the controller 12. Using this exposure signal, the print engine 11 causes the exposure device 2a, 2b, 2c or 2d to operate.

The controller 12 includes a gradation correction unit 21, a screen processing unit 22, a toner amount calculating unit 23 and a control unit 24. The gradation correction unit 21 performs a gradation correction process for image data. The screen processing unit 22 performs a screen process for the image data after the gradation correction process. The controller 12 provides to the print engine 11 the image data of each toner color after the image processing such as the gradation correction process, the screen process and the like. The toner amount calculating unit 23 calculates a toner consumption amount on the basis of the image data before the gradation correction process.

Figure 3:
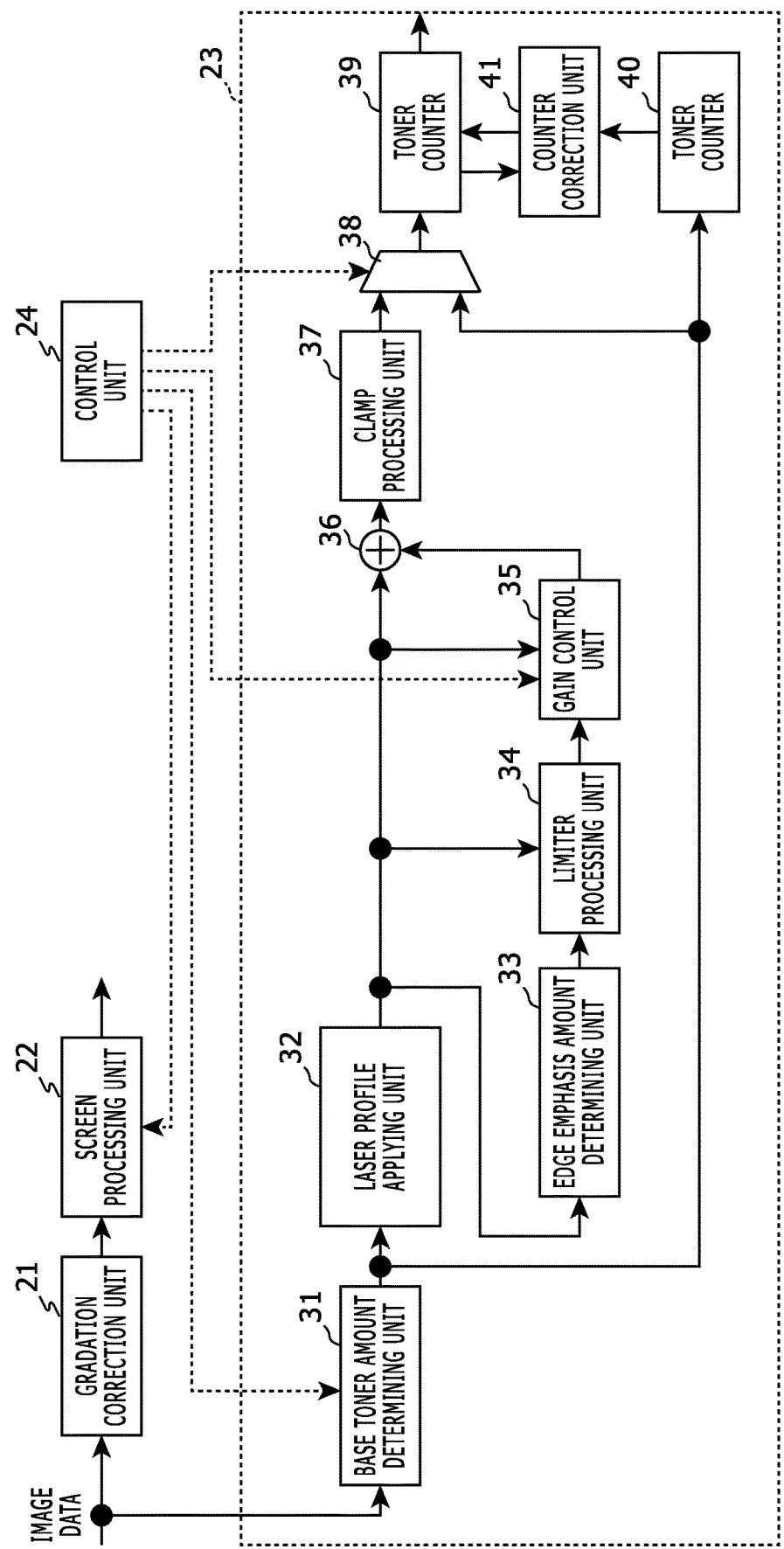
FIG. 3 shows a block diagram that indicates a configuration of a toner amount calculating unit 23 in Embodiment 1.

FIG. 3 shows a block diagram that indicates a configuration of a toner amount calculating unit 23 in Embodiment 1.

The toner amount calculating unit 23 includes a base toner amount determining unit 31, a laser profile applying unit 32, an edge emphasis amount determining unit 33, a limiter processing unit 34, a gain control unit 35, an adding unit 36, a clamp processing unit 37, a selector unit 38, toner counters 39 and 40, and a counter correction unit 41.

The base toner amount determining unit 31 determines a base toner amount without taking an edge effect into account, and the base toner amount corresponds to a pixel value of image data for which gradation correction has not been performed yet.

For example, in an experiment, using an internal area of a relatively large patch that edge effect does not affect, a relationship between pixel values and actual toner densities (i.e. toner consumption amounts) is measured; and the base toner amount determining unit 31 includes conversion data (lookup table, conversion formula data or the like) that indicates this relationship, and on the basis of this conversion data, determines a base toner amount corresponding to a pixel value of an image to be printed.

If the screen processing unit 22 is capable of using plural types of screens (plural screens having different numbers of screen lines from each other), the base toner amount determining unit 31 includes plural sets of the conversion data (lookup tables, conversion formula data or the like) corresponding to the plural screen types, and determines the base toner amount using the conversion data corresponding to the screen type currently selected by the screen processing unit 22.

The laser profile applying unit 32 performs a first spatial filter process for the aforementioned base toner amount, and the first spatial filter process corresponds to a laser profile (i.e. spatial intensity distribution of laser light used for the exposure) of the exposure device 2a, 2b, 2c or 2d.

Here the laser profile applying unit 32 performs the first spatial filter process using Gaussian filters independently of each other in a primary scanning direction and in a secondary scanning direction. Each of the Gaussian filters in the primary scanning direction and in the secondary scanning direction has a variance value corresponding to the laser profile. Specifically, in the first spatial filter process, the filter process in one of the primary and secondary scanning directions is performed, and thereafter for a result of this filter process the filter process in the other of the primary and secondary scanning directions is performed. Specifically, in each of the filter processes, a sum of products of filter coefficients and pixel values of adjacent pixels corresponding to the target pixel and the filter size is calculated as a result of the first spatial filter process for the target pixel.

The edge emphasis amount determining unit 33 performs a spatial filter process and thereby determines an edge emphasis amount corresponding to the edge effect. Specifically, the edge emphasis amount determining unit 33 performs a second spatial filter process for the base toner amount before or after the first spatial filter process (in Embodiment 1, the base toner amount after the first spatial filter process) and thereby determines an edge emphasis amount corresponding to the edge effect.

The edge emphasis amount determining unit 33 selects a target pixel in turn from pixels in a block as a spatial unit of the image processing, and determines an edge emphasis amount of the target pixel. In this process, for example, the edge emphasis amount determining unit 33 (a) performs the second spatial filter process for the base toner amount after the first spatial filter process by using a filter having filter coefficients in inverse proportion to squares of distances from the target pixel, and (b) sets as the edge emphasis amount a difference between a value obtained by the second spatial filter process and a value of the base toner amount of the target pixel.

Alternatively, for example, the edge emphasis amount determining unit 33 (a) performs the second spatial filter process for the base toner amount after the first spatial filter process by using an unsharp mask filter, and (b) sets as the edge emphasis amount a difference between a value obtained by the second spatial filter process and a value of the base toner amount of the target pixel. The unsharp mask filter is implemented with a Gaussian filter, for example. Further, here, the edge emphasis amount determining unit 33 performs the second spatial filter process using unsharp mask filters independently of each other in a primary scanning direction and in a secondary scanning direction. The unsharp mask filters in the primary and secondary scanning directions have variance values corresponding to edge effect intensity characteristics in the primary and secondary scanning directions, respectively. Specifically, in the second spatial filter process, the filter process in one of the primary and secondary scanning directions is performed and thereafter for a result of this filter process the filter process in the other of the primary and secondary scanning directions is performed.

Specifically, in each of the filter processes, a sum of products of filter coefficients and pixel values of adjacent pixels corresponding to the target pixel and the filter size is calculated as a result of the second spatial filter process for the target pixel.

The limiter processing unit 34 limits the edge emphasis amount to an uppermost value or less, and this uppermost value corresponds to the base toner amount after the first spatial filter process. Specifically, the limiter processing unit 34 determines a threshold value corresponding to the base toner amount after the first spatial filter process, and sets the edge emphasis amount as this threshold value if the determined edge emphasis amount exceeds this threshold value.

The limiter processing unit 34 sets the higher uppermost value (i.e. the higher threshold value) for the larger base toner amount after the first spatial filter process. The limiter processing unit 34 determines the aforementioned threshold value on the basis of the base toner amount after the first spatial filter process by using a conversion formula as a linear formula, a lookup table or the like.

Some types of the filters used for the second spatial filter process in the edge emphasis amount determining unit 33 may result in a larger edge emphasis amount for an edge part of a thin line than actual increase of a toner amount due to the edge effect, and therefore, in such a case, the limiter processing unit 34 sets the uppermost value for the edge emphasis amount and thereby restrains an error of the edge emphasis amount.

The limiter processing unit 34 is installed if required, and may be not required and not installed when the edge emphasis amounts determined by the edge emphasis amount determining unit 33 have some characteristics. For example, if the first spatial filter process uses a filter of which filter coefficients are in inverse proportion to squares of distances from a target pixel, then the limiter processing unit 34 is not required.

The gain control unit 35 multiplies the edge emphasis amount by a coefficient corresponding to the base toner amount after the first spatial filter process and uses this multiplication result as the edge emphasis amount, and thereby controls a gain of the edge emphasis amount. Consequently, even if edge emphasis amounts corresponding to values of the base toner amounts after the first spatial filter process have a non linear characteristic, the gain is adjusted so as to correspond to the non linear characteristic by the gain control unit 35.

For example, in an experiment, an edge emphasis amount is measured, and on the basis of the measured edge emphasis amount, a relationship between the base toner amount after the first spatial filter process and the gain corresponding to the edge effect; and the gain control unit 35 includes conversion data (lookup table, conversion formula data or the like) that indicates this relationship, and determines the aforementioned coefficient on the basis of this conversion data.

If the screen processing unit 22 is capable of using plural types of screens (plural screens having different numbers of screen lines from each other), the gain control unit 35 includes plural sets of the conversion data that express the relationships between the base toner amount after the first spatial filter process and the coefficient (lookup tables, conversion formula data or the like) corresponding to the plural screen types, and determines the aforementioned coefficient using the conversion data corresponding to the screen type currently selected by the screen processing unit 22 among the plural screen types.

The gain control unit 35 is installed if required, and may be not required and not installed when the edge emphasis amounts determined by the edge emphasis amount determining unit 33 have some characteristics.

The adding unit 36 calculates as a toner consumption amount a sum of (a) the base toner amount after the first spatial filter process and (b) the edge emphasis amount.

The clamp processing unit 37 (a) changes the toner consumption amount outputted from the adding unit 36 to a predetermined uppermost value if the toner consumption amount exceeds the uppermost value, and (b) changes the toner consumption amount outputted from the adding unit 36 to a predetermined lowermost value if the toner consumption amount is smaller than the lowermost value. The clamp processing unit 37 is installed if required, and may be not required and not installed when the output value of the adding unit 36 always falls into a specific range.

In accordance with a pixel type, the selector unit 38 selects one of: (a) the toner consumption amount provided through the clamp processing unit 37 and (b) the base toner amount, and outputs the selected one to the toner counter 39.

Figure 4:
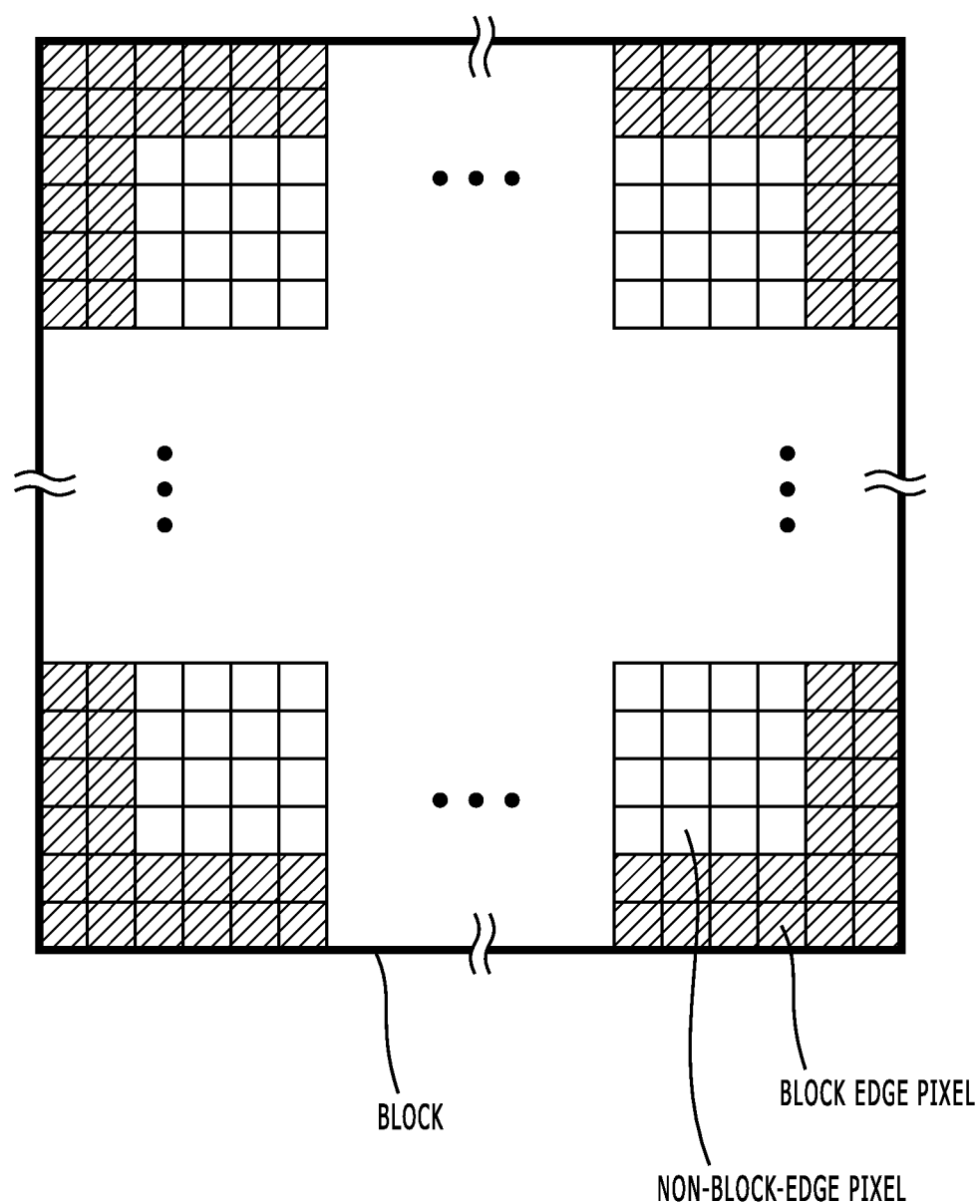
FIG. 4 shows a diagram that explains pixel types.

FIG. 4 shows a diagram that explains pixel types. Each pixel has a pixel property (i.e. pixel type) that is (a) a pixel near an edge of the block as a unit of the image processing (i.e. a hatched pixel in FIG. 4, hereinafter called "block edge pixel") or (b) a pixel other than the block edge pixel (i.e. a not-hatched pixel in FIG. 4, hereinafter called "non-block-edge pixel"). The pixel property is determined from a coordinate value of the pixel, for example.

A range of the block edge pixels is a range within a predetermined distance from outermost sides of the block, and is set in accordance with a size of the filters used in the first spatial filter process and the second spatial filter process. In other words, if the filter size is (2n+1) pixels, then pixels in a range of n pixels from block edges are determined as block edge pixels. For example, if the filter size is 5 pixels (that is, the number of pixels in the primary scanning direction and in the secondary scanning direction), then as shown in FIG. 4, pixels in a range of 2 pixels from block edges are determined as block edge pixels. Non-block-edge pixels in the blocks are pixels other than the block edge pixels.

The toner counter 39 counts as toner consumption amount the sum of (a) the base toner amount after the first spatial filter process and (b) the edge emphasis amount. The toner counter 40 counts the base toner amount. Thus, the toner counter 39 counts a toner consumption amount including an edge emphasis amount for a non-block-edge pixel in a block as a unit of the image processing, and counts a toner consumption amount not including an edge emphasis amount for a block edge pixel in the block; and the toner counter 40 counts a toner consumption amount not including an edge emphasis amount for the non-block-edge pixel and the block edge pixel.

In this embodiment, one of the toner consumption amount provided through the clamp processing unit 37 and the base toner amount is selected by the selector unit 38, and therefore, specifically, the toner counter 39 (a) counts the sum of the base toner amount after the first spatial filter process and the edge emphasis amount for a non-block-edge pixel in a block as a unit of the image processing and (b) counts the base toner amount before the first spatial filter process for a block edge pixel in the block. Contrarily, the toner counter 40 counts the base toner amount before the first spatial filter process for both of the block edge pixel and the non-block-edge pixel in the block.

The counter correction unit 41 calculates a toner consumption amount of the block on the basis of a difference between a toner counting value of the toner counter 39 and a toner counting value of the toner counter 40. In this embodiment, further, using the calculated toner consumption amount, the counter correction unit 41 corrects the toner consumption amount of the toner counter 39.

Specifically, the counter correction unit 41 estimates an edge emphasis amount of the block edge pixel on the basis of a difference on the non-block-edge pixel between a toner counting value of the toner counter 39 and a toner counting value of the toner counter 40, and calculates a toner consumption amount of the block. In this embodiment, on block edge pixels, a counting value of the toner counter 39 and a counting value of the toner counter 40 are identical to each other; and therefore, a difference between a counting value of the toner counter 39 and a counting value of the toner counter 40 on the whole block is identical to the difference between a counting value of the toner counter and a counting value of the toner counter 40 on non-block-edge pixels.

Specifically, the counter correction unit 41 calculates a toner consumption amount of the block on the basis of (a) a ratio between the number N1 of block edge pixels and the number N2 of non-block-edge pixels and (b) a counting value of the toner counter 40 (i.e. a counting value of the base toner amount without taking the edge effect into account), and corrects the toner consumption amount of the toner counter 39 to get the calculated toner consumption amount. When the counting value of the toner counter 40 is expressed as TC1 and the counting value of the toner counter 39 is expressed as TC2, the counter correction unit 41 corrects the counting value TC2 of the toner counter 39 to TC2+(TC2−TC1)*(N1/N2).

For example, if a pixel value is obtained of a pixel in a block adjacent to a block as a processing target and a toner consumption amount is calculated using the obtained pixel value in a same manner for both a block edge pixel and a non-block-edge pixel, the selector unit 38, the toner counter 40 and the counter correction unit 41 may not be installed.

Further, the toner amount calculating unit 23 may calculate a toner residual amount in a toner cartridge from the toner consumption amount. Furthermore, the toner amount calculating unit 23 displays an integrated value of the toner consumption amount and/or the toner residual amount on an operation panel (not shown) and/or displays a warning message on operation panel (not shown) when the toner residual amount gets a low level.

Further, the control unit 24 controls sorts of processes in the controller 12. For example, the control unit 24 specifies to the screen processing unit 22 a screen type of a screen to be used, and notifies the base toner amount determining unit 31 and the gain control unit 35 of the screen type selected by the screen processing unit 22. Further, the control unit 24 provides to the selector unit pixel property data that indicates whether the pixel property (pixel type) of the target pixel is block edge pixel or non-block-edge pixel.

The following part explains a behavior of the image forming apparatus in Embodiment 1.

When image data is provided from the controller 12 to the print engine 11, the print engine 11 generates exposure signals on the basis of the image data. The exposure signals are provided to the exposure devices 2a to 2d, and the exposure devices 2a to 2d irradiate the photoconductor drums 1a to 1d with light on the basis of the exposure signals and thereby form electrostatic latent images.

Contrarily, the controller 12 calculates toner consumption amounts of the toner colors on the basis of the image data (e.g. CMYK data) before the gradation correction.

In the controller 12, firstly, the base toner amount determining unit 31 determines a base toner amount of each pixel on the basis of the image data before the gradation correction. Subsequently, the laser profile applying unit 32 performs the first spatial filter process corresponding to the laser profile.

In Embodiment 1, for each pixel, the edge emphasis amount determining unit 33 performs the second spatial filter process for the base toner amount after the first spatial filter process, and thereby determines an edge emphasis amount. The edge emphasis amount is provided to the adding unit 36 through the limiter processing unit 34 and the gain control unit 35. A sum of the base toner amount after the first spatial filter process and the edge emphasis amount is calculated by the adding unit 36, and provided to the selector unit 38 through the clamp processing unit 37.

In the selector unit 38, for a non-block-edge pixel, the sum of the base toner amount after the first spatial filter process and the edge emphasis amount is selected, and for a block edge pixel, the base toner amount is selected, and the selected one is provided to the toner counter 39.

Subsequently, toner consumption amounts of all pixels in a block as a processing target are calculated, and the toner counter 39 calculates a total (aforementioned TC2) of the toner consumption amounts of these pixels. Meanwhile, the toner counter 40 calculates a total (aforementioned TC1) of the base toner amounts of all pixels. Subsequently, the counter correction unit 41 corrects the toner consumption amount TC2 of this block in the aforementioned manner.

As mentioned, in Embodiment 1, the base toner amount determining unit 31 determines a base toner amount without taking an edge effect into account, and the base toner amount corresponds to a pixel value of image data for which gradation correction is not performed. The laser profile applying unit 32 performs for the base toner amount a first spatial filter process corresponding to a laser profile of the exposure device 2a, 2b, 2c or 2d. The edge emphasis amount determining unit 33 performs a second spatial filter process for the base toner amount before the first spatial filter process or after the first spatial filter process and thereby determines an edge emphasis amount corresponding to the edge effect. The toner counter 39 counts as toner consumption amount the sum of the base toner amount after the first spatial filter process and the edge emphasis amount.

Consequently, a toner consumption amount is properly calculated with taking into account (a) a laser profile and (b) edge effect on the laser profile so as not to be affected by gradation correction.

Embodiment 2

Figure 5:
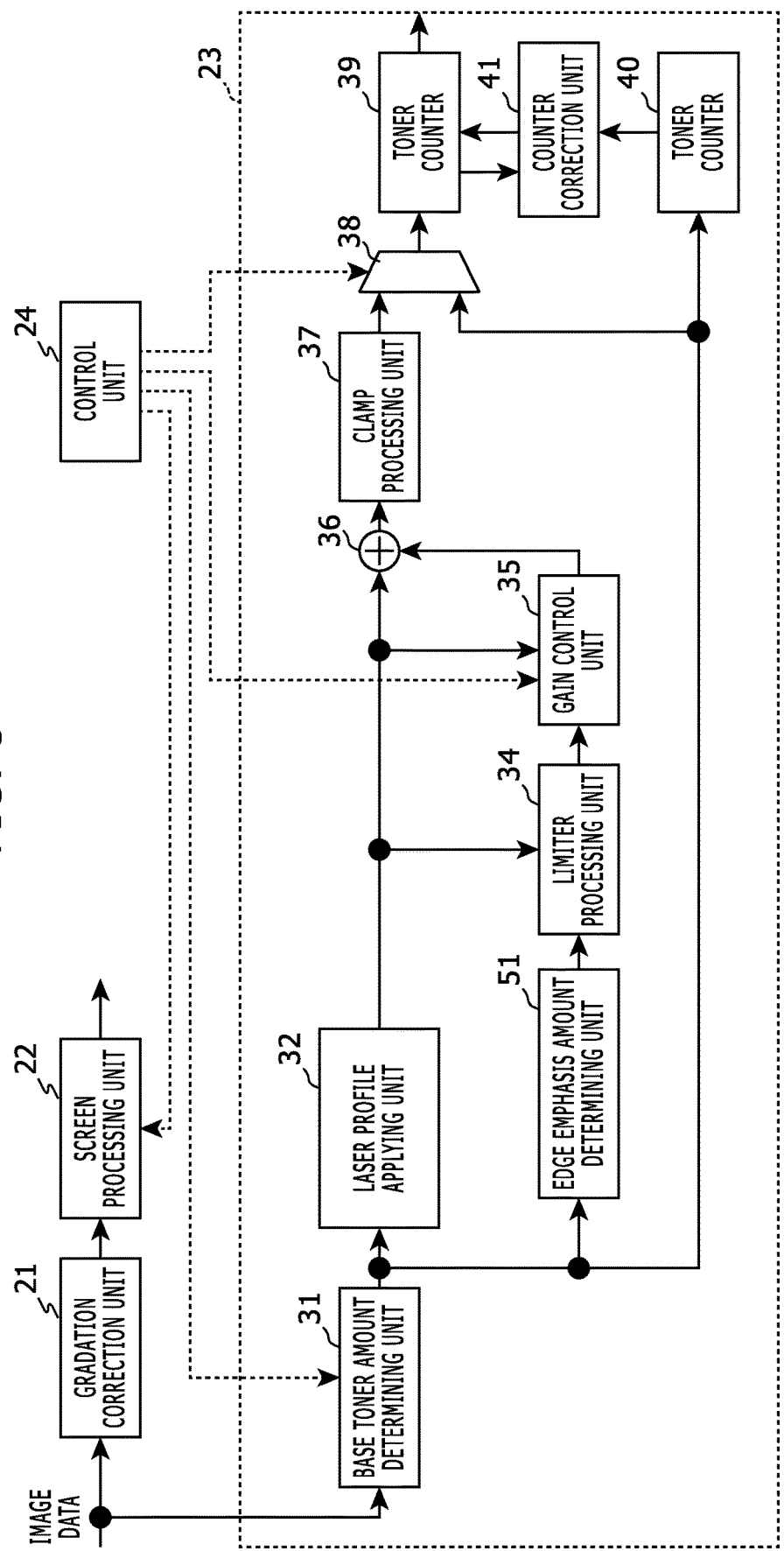
FIG. 5 shows a block diagram that indicates a configuration of a toner amount calculating unit 23 in Embodiment 2.

FIG. 5 shows a block diagram that indicates a configuration of a toner amount calculating unit 23 in Embodiment 2. In Embodiment 2, an edge emphasis amount determining unit 51 is used instead of the edge emphasis amount determining unit 33. The edge emphasis amount determining unit 51 (a) performs the second spatial filter process for the base toner amount before the first spatial filter process by using a DoG (Difference-of-Gaussian) filter, and (b) sets as the edge emphasis amount a value obtained by the second spatial filter process. Specifically, in the second spatial filter process, a sum of products of filter coefficients and pixel values of adjacent pixels corresponding to the target pixel and the filter size is calculated as a result of the second spatial filter process for the target pixel.

Figure 6:
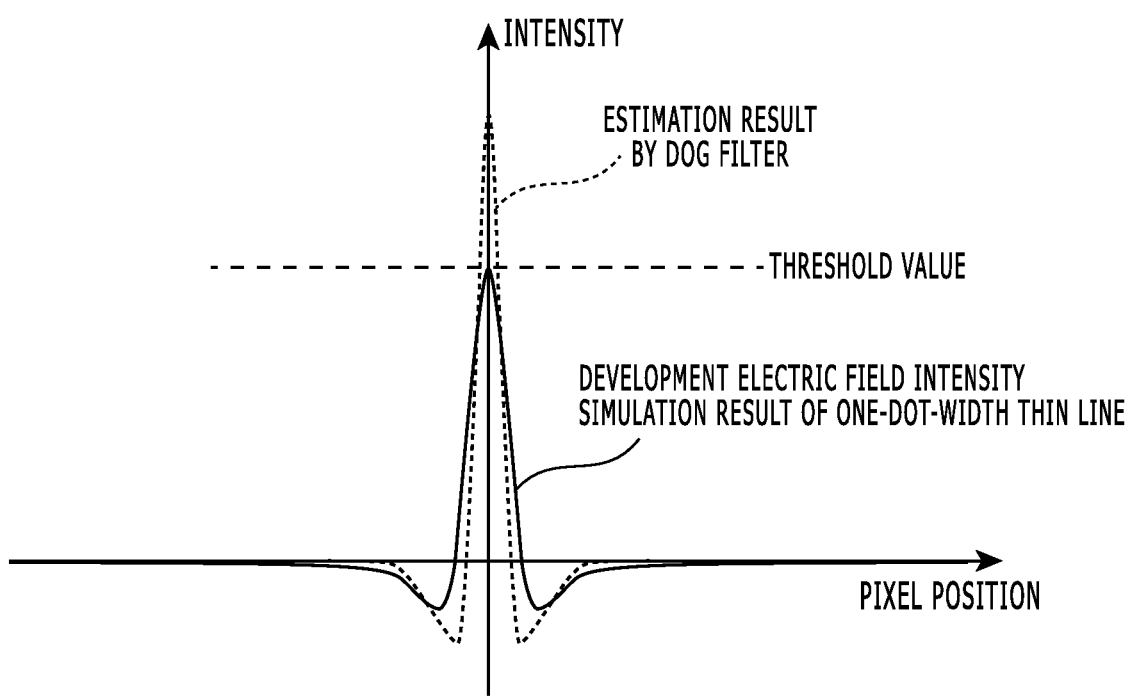
FIG. 6 shows a diagram that explains a behavior of a limiter processing unit 34 in Embodiment 2.

FIG. 6 shows a diagram that explains a behavior of a limiter processing unit 34 in Embodiment 2. As shown in FIG. 6, in case of one-dot width thin line, the DoG filter has a higher peak than an actual electric field distribution. Therefore, as mentioned, the aforementioned threshold value (i.e. the aforementioned uppermost value) is set to be lower than a peak of edge emphasis amount in an edge part of a thin line. Consequently, the edge emphasis amount is limited with this threshold value and the error is restrained.

In the aforementioned Difference-of-Gaussian filter, two Gaussian filters of which variance values are different from each other are used, and a difference of output values of these Gaussian filters is set as an output value of the Difference-of-Gaussian filter.

Figure 7:
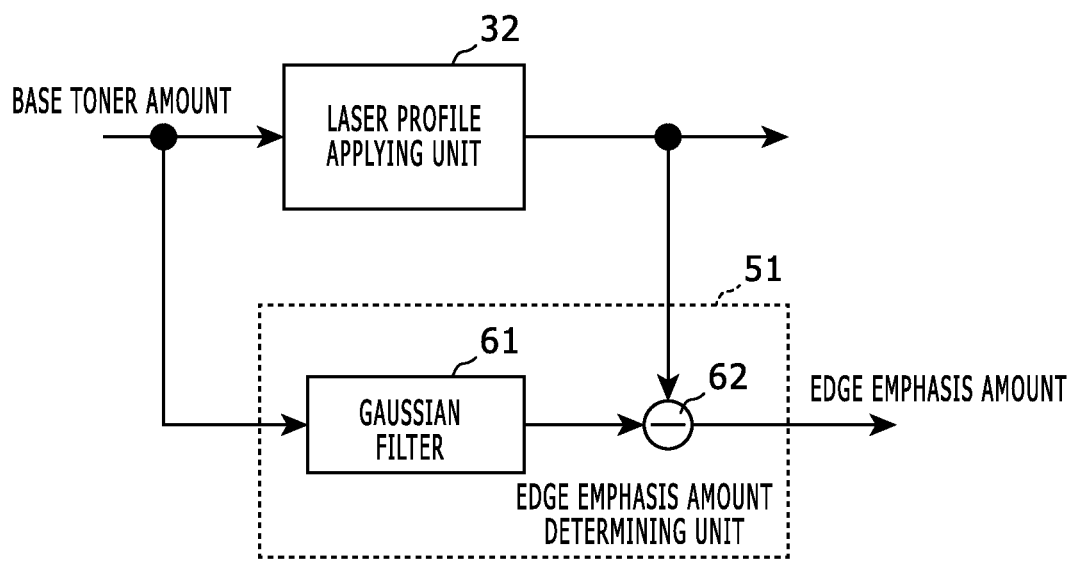
FIG. 7 shows a block diagram that indicates an example of an edge emphasis amount determining unit 51 in Embodiment 2.

FIG. 7 shows a block diagram that indicates an example of an edge emphasis amount determining unit 51 in Embodiment 2. If the laser profile applying unit 32 performs the first spatial filter using a Gaussian filter, then as shown in FIG. 7, the edge emphasis amount determining unit 51 may include a Gaussian filter 61 and a subtractor 62, and a variance value of the Gaussian filter 61 is different from the Gaussian filter of the laser profile applying unit 32; and the aforementioned Difference-of-Gaussian filter may be formed with the Gaussian filter of the laser profile applying unit 32, the Gaussian filter 61 of the edge emphasis amount determining unit 51, and the subtractor 62. Thus, the edge emphasis amount determining unit 51 may include only one Gaussian filter 61 with a larger variance value among two Gaussian filters of the Difference-of-Gaussian filter, and may use the Gaussian filter of the laser profile applying unit 32 as a Gaussian filter with a lower variance value among the two Gaussian filters. In such a case, a difference between an output value of the Gaussian filter 61 and an output value of the laser profile applying unit 32, that is derived by the subtractor 62, is set as an output value of the edge emphasis amount determining unit 51.

Other parts of the configuration and behaviors of the image forming apparatus in Embodiment 2 are identical or similar to those in Embodiment 1, and therefore not explained here.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, while the image forming apparatus in the aforementioned embodiment is a color image forming apparatus, the feature of the present disclosure can also be applied to a monochrome image forming apparatus.

What is claimed is:
1. An image forming apparatus, comprising:
an exposure device;
a base toner amount determining unit configured to determine a base toner amount without taking edge effect into account, the base toner amount corresponding to a pixel value of image data for which gradation correction has not been performed;
a laser profile applying unit configured to perform for the base toner amount a first spatial filter process corresponding to a laser profile of the exposure device;

an edge emphasis amount determining unit configured to perform a second spatial filter process for the base toner amount before the first spatial filter process or after the first spatial filter process and thereby determine an edge emphasis amount corresponding to the edge effect; and a toner counter configured to count as a toner consumption amount a sum of the base toner amount after the first spatial filter process and the edge emphasis amount.

2. The image forming apparatus according to claim 1, wherein the edge emphasis amount determining unit (a) performs the second spatial filter process for the base toner amount after the first spatial filter process by using a filter having filter coefficients in inverse proportion to squares of distances from the target pixel, and (b) sets as the edge emphasis amount a difference between a value obtained by the second spatial filter process and a value of the base toner amount of the target pixel.

3. The image forming apparatus according to claim 1, wherein the edge emphasis amount determining unit (a) performs the second spatial filter process for the base toner amount after the first spatial filter process by using an unsharp mask filter, and (b) sets as the edge emphasis amount a difference between a value obtained by the second spatial filter process and a value of the base toner amount of the target pixel.

4. The image forming apparatus according to claim 1, wherein the edge emphasis amount determining unit (a) performs the second spatial filter process for the base toner amount after the first spatial filter process by using a Difference-of-Gaussian filter, and (b) sets as the edge emphasis amount a difference between a value obtained by the second spatial filter process and a value of the base toner amount of the target pixel.

5. The image forming apparatus according to claim 4, wherein the laser profile applying unit performs the first spatial filter process using a Gaussian filter;

the edge emphasis amount determining unit comprises (a) a Gaussian filter that has a variance value different from a variance value of the Gaussian filter of the laser profile applying unit, and (b) a subtractor; and the Difference-of-Gaussian filter comprises the Gaussian filter of the laser profile applying unit, the Gaussian filter of the edge emphasis amount determining unit, and the subtractor.

6. The image forming apparatus according to claim 3, wherein the edge emphasis amount determining unit performs the second spatial filter process using filters independently of each other in a primary scanning direction and in a secondary scanning direction.

7. The image forming apparatus according to claim 4, wherein the edge emphasis amount determining unit performs the second spatial filter process using filters independently of each other in a primary scanning direction and in a secondary scanning direction.

8. The image forming apparatus according to claim 1, wherein the laser profile applying unit performs the first spatial filter process using Gaussian filters independently of each other in a primary scanning direction and in a secondary scanning direction.

9. A toner amount calculating method, comprising the steps of:

determining a base toner amount without taking edge effect into account, the base toner amount corresponding to a pixel value of image data for which gradation correction has not been performed;

performing for the base toner amount a first spatial filter process corresponding to a laser profile of an exposure device;

performing a second spatial filter process for the base toner amount before the first spatial filter process or after the first spatial filter process and thereby determining an edge emphasis amount corresponding to the edge effect; and counting as a toner consumption amount a sum of the base toner amount after the first spatial filter process and the edge emphasis amount.

* * * * *